United States Patent [19]
Erwin

[11] Patent Number: 6,079,753
[45] Date of Patent: Jun. 27, 2000

[54] SEGMENTED FLANGE INCLUDING A SHIM

[75] Inventor: Roger D. Erwin, Peabody, Mass.

[73] Assignee: Erwin's LLC, Arlington, Mass.

[21] Appl. No.: 08/987,058

[22] Filed: Dec. 9, 1997

Related U.S. Application Data

[63] Continuation-in-part of application No. 08/629,187, Apr. 8, 1996, Pat. No. 5,755,464, which is a continuation-in-part of application No. 08/614,355, Mar. 12, 1996, abandoned.

[51] Int. Cl.[7] ................................................. F16L 23/00
[52] U.S. Cl. ......................... 285/415; 285/414; 285/328
[58] Field of Search ..................................... 285/415, 417, 285/414, 363, 368, 411, 367, 328, 111

[56] References Cited

U.S. PATENT DOCUMENTS

| | | | |
|---|---|---|---|
| 2,359,952 | 10/1944 | Welger | 285/368 X |
| 3,181,901 | 5/1965 | Watts | 285/367 |
| 3,761,114 | 9/1973 | Blakeley | 285/111 |
| 5,209,524 | 5/1993 | Corwon et al. | 285/368 X |

*Primary Examiner*—Lynne H. Browne
*Assistant Examiner*—David E. Bochna
*Attorney, Agent, or Firm*—Paul J. Cook

[57] ABSTRACT

A flange structure formed from a plurality of joined flange segments is provided. The joined flange segments form a generally circular opening for a conduit. The generally circular opening has a perimeter formed from a first surface segment and extending in a direction generally perpendicular to the faces, a second surface segment tapered toward one of the faces and a slot section. The flange structure can be connected to a substrate by fasteners extending through two oval shaped openings connecting the two faces. At least one shim is attached to the flange segments about the circular opening. The shim has an inner surface with essentially the same surface configuration as the generally circular opening of the flange segments.

20 Claims, 8 Drawing Sheets

SEGMENTED FLANGE INCLUDING A SHIM

REFERENCE TO RELATED APPLICATION

This application is a continuation-in-part of application Ser. No. 08/629,187, filed Apr. 8, 1996 now U.S. Pat. No. 5,755,464 which, in turn is a continuation in part of application Ser. No. 08/614,355, filed Mar. 12, 1996, now abandoned.

BACKGROUND OF THE INVENTION

This invention relates to a flange structure. More particularly, this invention relates to a flange structure utilized to replace damaged flanges such as flanges utilized to connect conduits.

At the present time, it is common to connect conduits with a flange on each conduit together with means for securing the flanges to each other. Automobile exhaust systems are an example of a system of connected conduits which utilize connecting flanges. These exhaust systems include a plurality of connected modules such as pipes, a catalytic converter and an exhaust muffler. The modules are provided with flanges to effect connection with an adjacently positioned module such as with bolts extending through the flanges which are secured with nuts. As automobile exhaust systems are operated in a corrosive environment, particularly in winter conditions when the system is exposed to salt, moisture and sand, portions of the system, including the flanges become severely corroded to the extent that they become detached from an adjacent flange. When this condition occurs, repairs must be made so that connection of modules in the exhaust system can be reestablished in order to permit the system to function properly. Oftentimes, it is not possible to repair the flange, thereby necessitating replacement of the entire module to which the flange is attached. This damaged flange condition also requires unnecessary expense since the remaining portion of the module, such as the exhaust muffler or catalytic converter can be in acceptable working order.

It has been proposed in U.S. Pat. No. 4,519,639 to provide a segmented hinged flange for a conduit. The flange segments are formed from laminated metal sheets which interleave with metal sheets of an adjacently positioned segment at the juncture points between segments. The segments surround a conduit to be attached to an adjacent conduit. The segments are joined by bolts extending through the laminated metal sheets at the juncture points. The joining bolts extend beyond the thickness of the segments and thus increase the effective thickness of the flange. This, in turn, limits the use of the flange to a relatively large volume of space to accommodate both the flange thickness and the added thickness of the added bolts. In addition, the interior size of the flange opening is not adjustable so that a wide size range of flange structures must be provided to accommodate a wide variety of conduit sizes.

U.S. Pat. No. 5,203,593 discloses a flexible exhaust coupling utilizing resilient annular gasket means designed to permit related movement between adjacent joined conduits.

U.S. Pat. No. 5,228,726 discloses an exhaust system clamp having flared flanges for connecting two conduits to permit axial expansion of the conduits during use.

U.S. Pat. No. Des. 263,415 discloses a design for a pipe coupling flange.

It would be desirable to provide a flange structure which can be attached to a conduit to accommodate conduits of varying sizes. It would also be desirable to provide a flange structure which can be attached to a conduit to accommodate conduits of varying sizes. It would also be desirable to provide such a flange structure including means for attaching the flange structure to a conduit which occupies a minimum volume. In addition, it would be desirable to provide such a flange structure which can be secured to a slightly damaged conduit surface or to a conduit with a flared end while minimizing or preventing damage to the conduit.

SUMMARY OF THE INVENTION

The present invention provides a flange structure formed from a plurality, usually two, mating flange segments, each having a means for connecting the segments together which can include one or more shims to accommodate varying size conduits. Each flange segment is provided with two generally flat faces and an opening connecting the flat faces for housing a means for connecting the flange structure to a substrate such as a second flange. Each flange segment is provided with a generally circular arc surface such as a semi-circular arc surface which, when connected to at least one other flange segment forms a generally circular opening for housing a conduit or pipe having a generally circular outside surface. The means for connecting the segments comprises generally cylindrically shaped housings for accommodating a bolt or the like which extends between adjacent segments but does not extend through the generally flat faces.

The generally circular opening surface at a central portion of the joined segments has a perimeter, a portion of which is flared outwardly away from a central axis of the generally circular opening and a portion of which extends in a generally parallel direction to the central axis of the opening. Both the portion of the opening which extends in a generally parallel direction to the central axis of the opening and the portion flared outwardly comprise smooth surfaces. One or more shim sections are connected to the generally circular opening to provide a means for reducing the diameter of the opening. The shims have an exposed surface having essentially the same shape as the opening surface. The shims are shaped to snap fit onto the flange segments, either directly on the flange segments or on a shim previously snap fit on the flange segments.

In one aspect of the present invention, the opening of the flange segments comprises the flared surface portion connected directly to the portion which extends generally parallel to the central axis of the opening which, in turn, is connected directly to a slot portion of the surface. The slot portion is formed of a third surface portion which extends in a direction away from the central axis of the generally circular opening. Preferably, the third surface portion extends in a direction generally perpendicular to the portion which extends generally parallel to the central axis. The third surface portion is directly connected to a fourth surface portion which, together with the third surface portion forms the slot portion. The slot portion facilitates snap fitting of the shims to the opening. The remaining shims are shaped in the same shape as the opening. Optionally, the last secured shim is free of the slot portion since no additional shim is attached to it.

DESCRIPTION OF SPECIFIC EMBODIMENTS

The flange structure of this invention is formed by connecting a plurality, preferably two, flange segments with connecting means such as bolts or the like which extend between adjacent flange segments but which do not extend through the flat faces of the flange segments. Shim sections are provided which mate with the shape of a central opening formed by the flange segments and are shaped to be snap fit onto the flange segment. The shim sections are used to adjust the size of the central opening. An exposed surface of the shim sections have essentially the same surface configuration as the surface of the central opening. Optionally, the last applied shim section can have a smooth surface different from the surface configuration of the central opening since additional shim sections are not snap fit thereon.

By orienting the connecting means so that their central axis extends in a direction generally parallel to the planes of the flat flange segment surfaces rather than generally perpendicular to these planes, the connecting means do not increase the effective thickness of the flange structure. If the connecting means were oriented so that they passed through the flat flange segment surface, the heads of the bolts as well as the nuts connecting the bolts would extend past the flat flange segment surfaces, thereby effectively increasing the flange structure thickness. This increased effective thickness undesirably increases the minimum volume into which the flange structure can be positioned.

Since the generally circular surface of the flange structure which surrounds a generally cylindrical conduit or pipe, has a tapered surface section and a generally cylindrical section, the flange structure of this invention can accommodate a wide variety of conduits or pipes. For example, conduits having a flared end can be fitted with the tapered surface section of the flange structure. In addition, conventional cylindrical conduits can be fitted with the cylindrical surface section. The shim sections which are secured to the generally circular surface of the flange structure has an exposed surface including a tapered surface section and a generally cylindrical surface.

The shim sections are shaped so that they can be snap fit on the flange segment. The shim section can be provided with a tab that extends beyond a flat surface of a flange segment to effect the snap fit onto a flange segment. Alternatively, the shim sections can be provided with a tab which extends into a slot portion in the central opening of a flange segment or into a slot portion formed in an adjacently positioned shim section. The last applied shim section having its central opening exposed can be provided with a slot portion or can be free of a slot portion.

Figure 1:
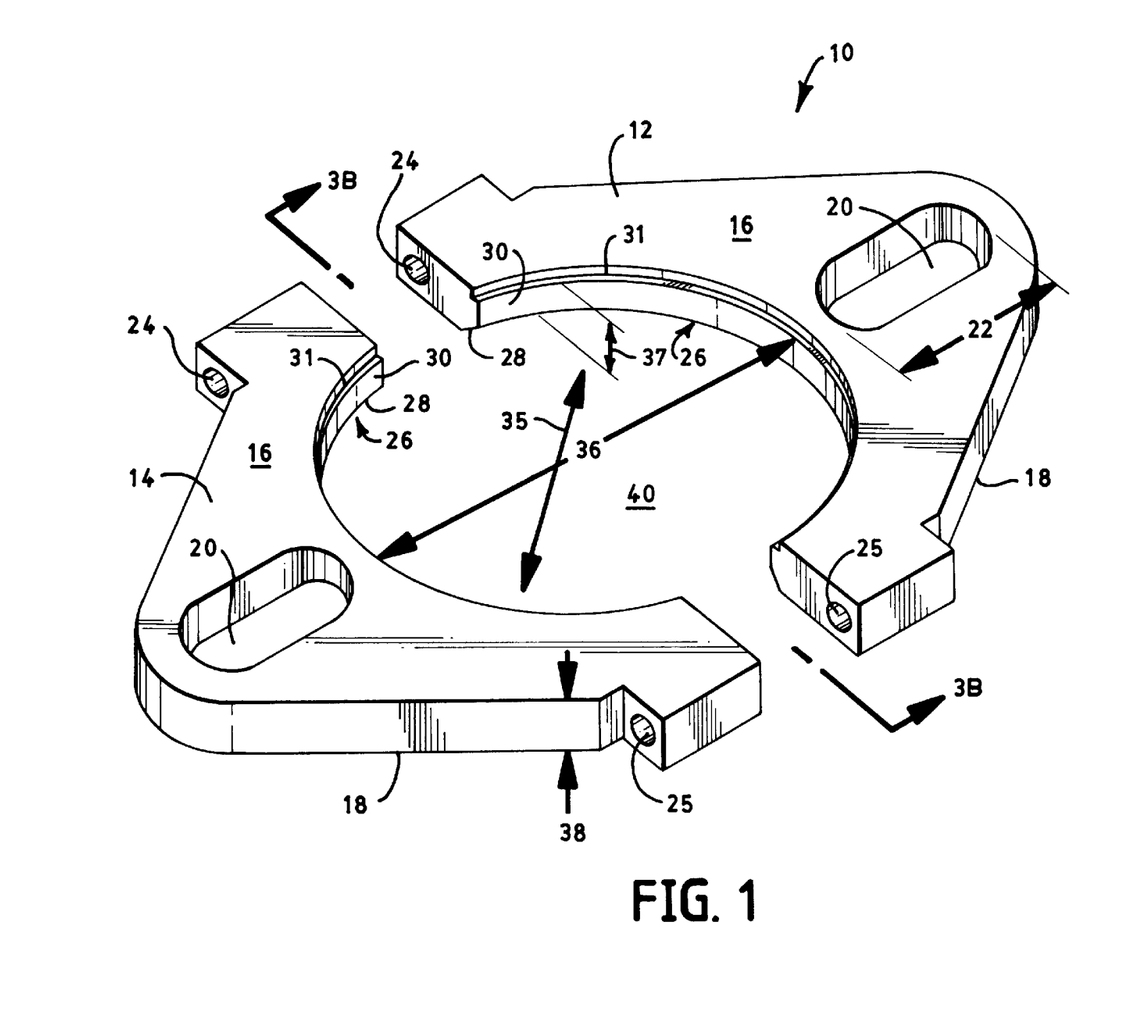
FIG. 1 is a perspective view of a flange structure of this invention.
Figure 2:
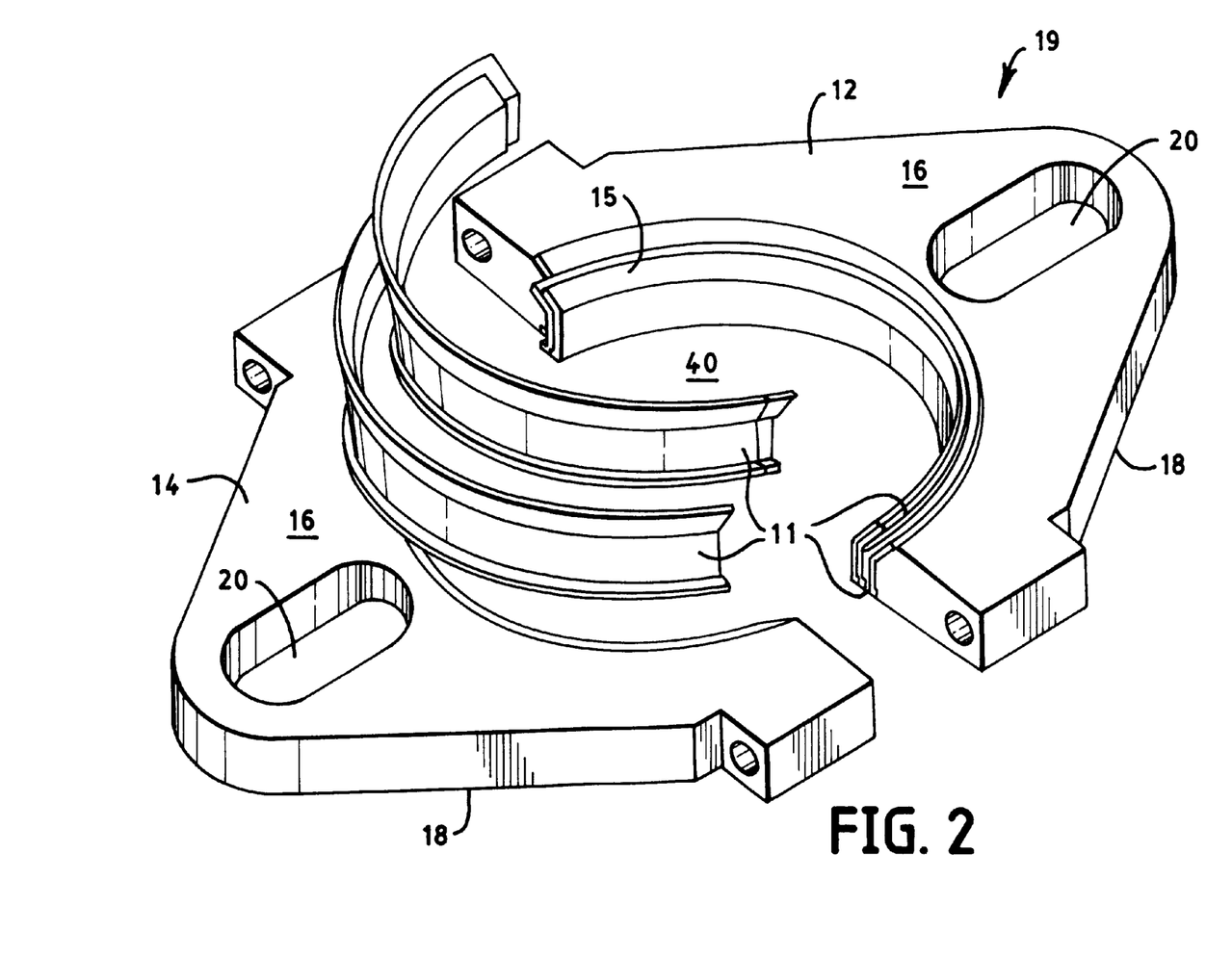
FIG. 2 is a perspective exploded view of the flange structure of FIG. 1 including shims.
Figures 3, 3A:
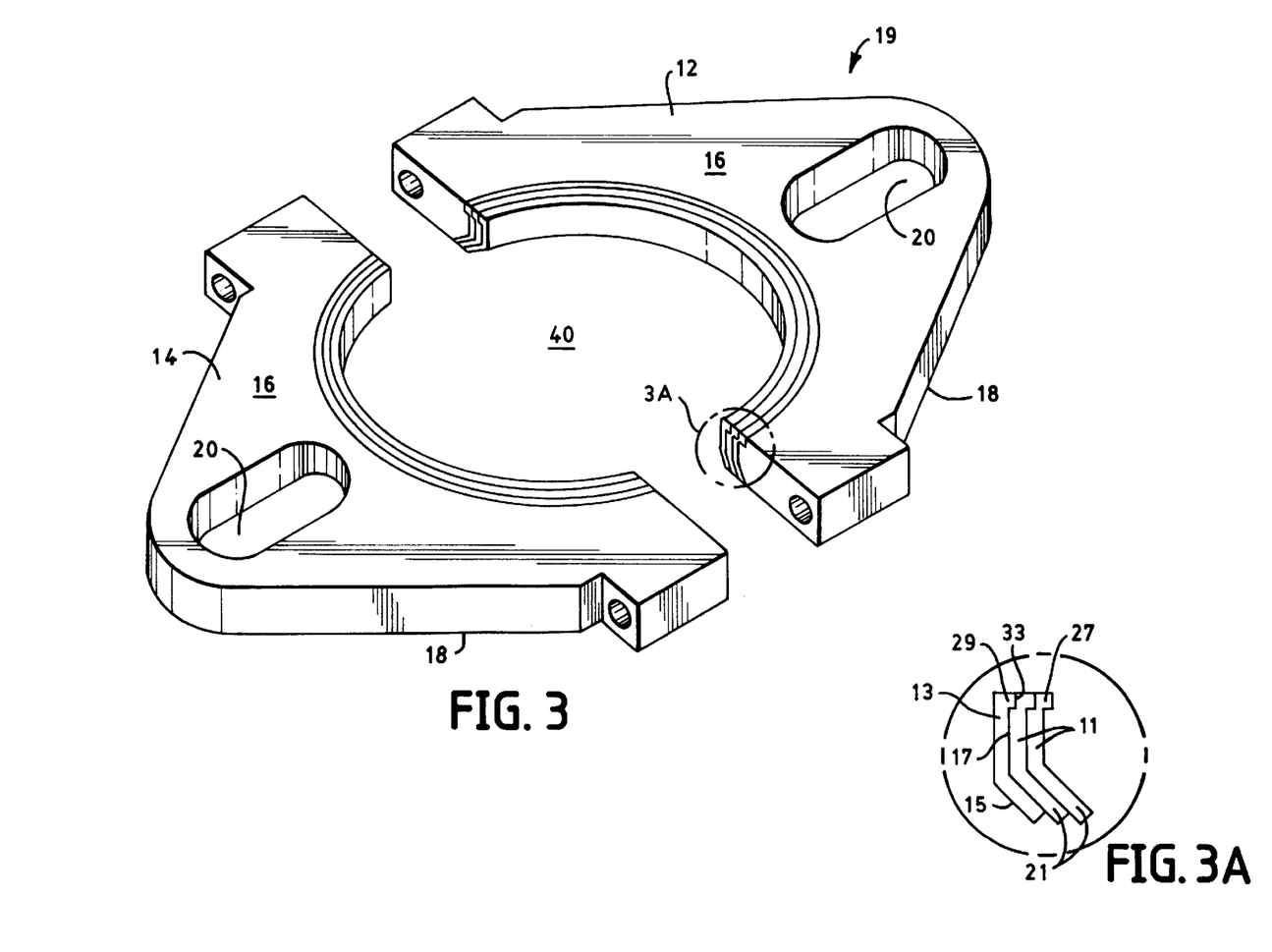
FIG. 3 is a perspective view of the flange structure of FIG. 1 with the shims in place.
FIG. 3A is an expanded view showing a plurality of shims snap fit together.

Referring to FIGS. 1, 2, 3 and 3 A, the flange structure of this invention 10 is formed from two flange segments 12 and 14, each having two relatively flat surfaces 16 and 18. The flange structure 10 comprises a novel structure due to the configuration of the generally circular arc surface 26 discussed below. The oval shaped openings 20 are shaped to accommodate a stem of a fastening device (not shown) such as a bolt, screw or the like. The oval openings 20 are sized so that a conventional head (not shown) of the fastening device is sized to be positioned on surface 16 or 18 while the stem of the fastening device is sized to extend through oval openings 20 and be positioned along the length 22 of opening 20. The oval openings 20 permit adjustment of the position of flange segments 12 and 14 to permit positioning on a conduit 3 having a flared end 37 having a range of diameters. Each flange segment 12 and 14 is provided with generally cylindrical openings 24 and 25 through which fit conventional fasteners such as bolts or the like in order to secure flange segments 12 and 14 together.

Each flange segment 12 and 14 is provided with a generally circular arc surface 26 having a tapered surface section 28 and a generally cylindrical surface section 30 and a slot segment 31 to permit receiving a shim 5 in the flange segments 12 and 14. The tapered section 28 of the flange segments 12 and 14 permits the flange segments 12 and 14 to be positioned about a conduit having a flared end. The cylindrical section 30 of flange segments 12 and 14 permits the flange segments 12 and 14 to be fit about a conduit having a generally cylindrical outside surface. The slot segment 31 facilitates attachment of a suitably shaped shim to the flange segments 12 and 14 as discussed in more detail below.

The flange segments 12 and 14, when utilized without one or more shims, are secured about a conduit by virtue of forces exerted by fastening means such as a bolt and nut extending through the generally cylindrical openings 24 and 25.

The flange segments 12 and 14 need not contact each other so that the diameter of the central opening 36 formed by the flange segments 12 and 14 can be adjusted to accommodate conduits of varying diameter. The opening 36 has a central axis 35 which extends generally parallel to the width 37 of the cylindrical surface section 30.

Since fastening means extend through generally cylindrical opening 24 and 25, the fastening means (not shown) do not increase or significantly increase the effective thickness 38 of the flange segments 12 and 14. Thus, the formed flange structure can be positioned within a volume having a maximum thickness as small as the thickness 38 of the flange structure 10.

The shim sections 11, like the flange segments 12 and 14 include a smooth flared segment 15, a smooth generally cylindrical surface section 17, a slot section 33 and a flange section 27. Likewise, the shim section 13 include a flared segment 15, a generally cylindrical surface section 17 and a flange section 29. The shim section 13 also can include a slot section (not shown) shaped as is slot section 33, if desired. The flange sections 27 permit the shims to snap fit about the flange segments 12 and 14. The shim sections 13 include a flange section 29 to permit them to fit about the shim sections 11. The tapered sections 21 and 15 of the shim segments 11 and 13 permits the flange structure 12 and 14 to be positioned about a conduit having a flared end. The cylindrical section 17 permits the flange segments 12 and 14 and shim sections 11 and 13 to be fit about a conduit having a generally cylindrical outside surface.

Figure 3B:
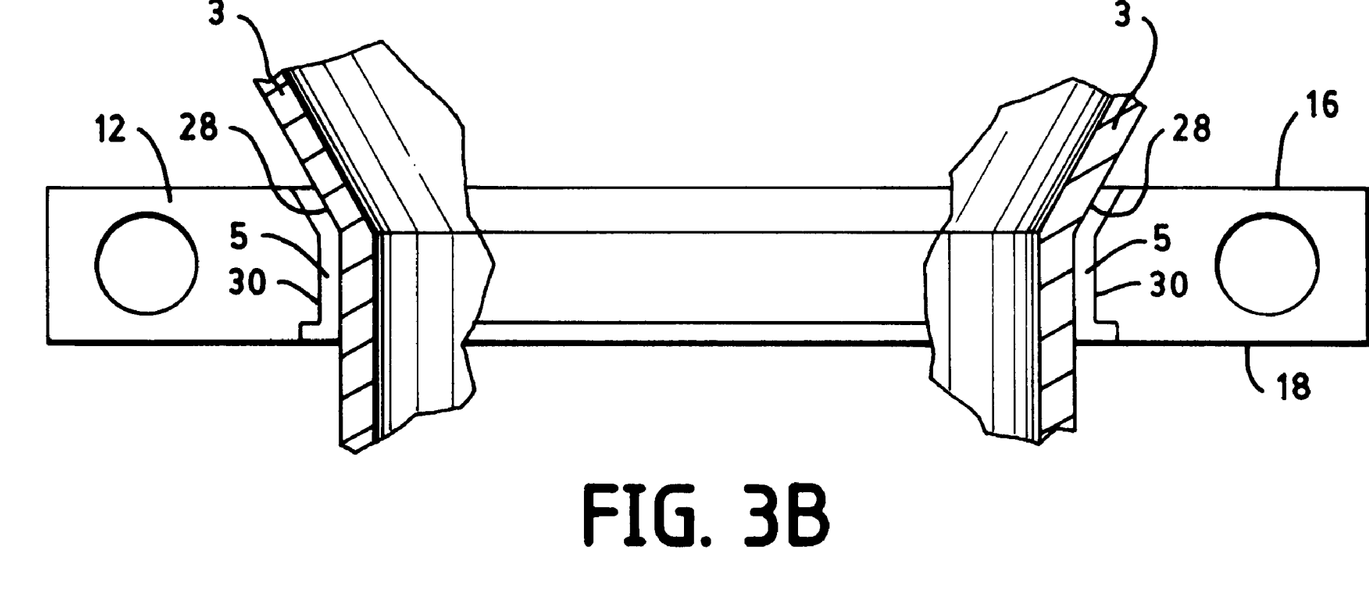
FIG. 3B is a side view of the flange structure of FIG. 1 showing one shim and a pipe taken long line 3—3.

The flange structure 19 is secured about a conduit by virtue of forces exerted by fastening means such as a bolt and nut extending through the generally cylindrical openings 24 and 25. The flange segments 12 and 14 need not contact each other so that the diameter of the central opening 26 formed by the flange segments 12 and 14 can be adjusted to accommodate conduits of varying diameter.

Figure 4:
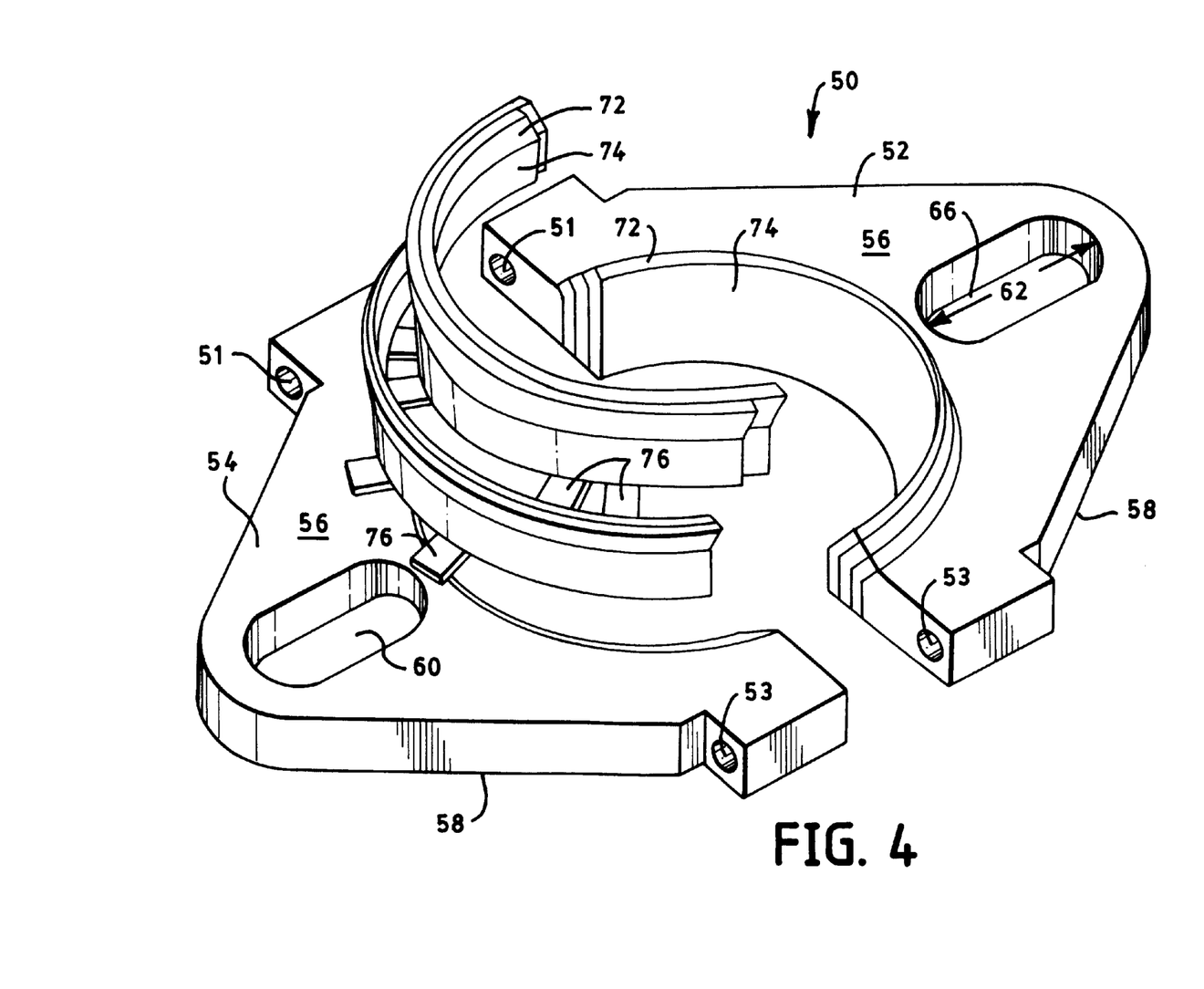
FIG. 4 is a perspective exploded view of an alternative arrangement of a flange structure and shim sections of this invention.

As shown in FIG. 4, a plurality of shim sections 11 and 13 to form a plurality of shims can be utilized. It is convenient to form the shims sections having 1/16 inch thick so that a shim layer reduces the diameter of opening 40 by 1/8 inch from that of the joined flange segments 12 and 14. It is convenient to utilize from one to three shims for a flange structure 10 of a given diameter. Typically, the diameter of the central hole of the flange structure with shims can range from about 1 inch to about 5 inches to accommodate a wide variety of conduit diameters.

Figure 5:
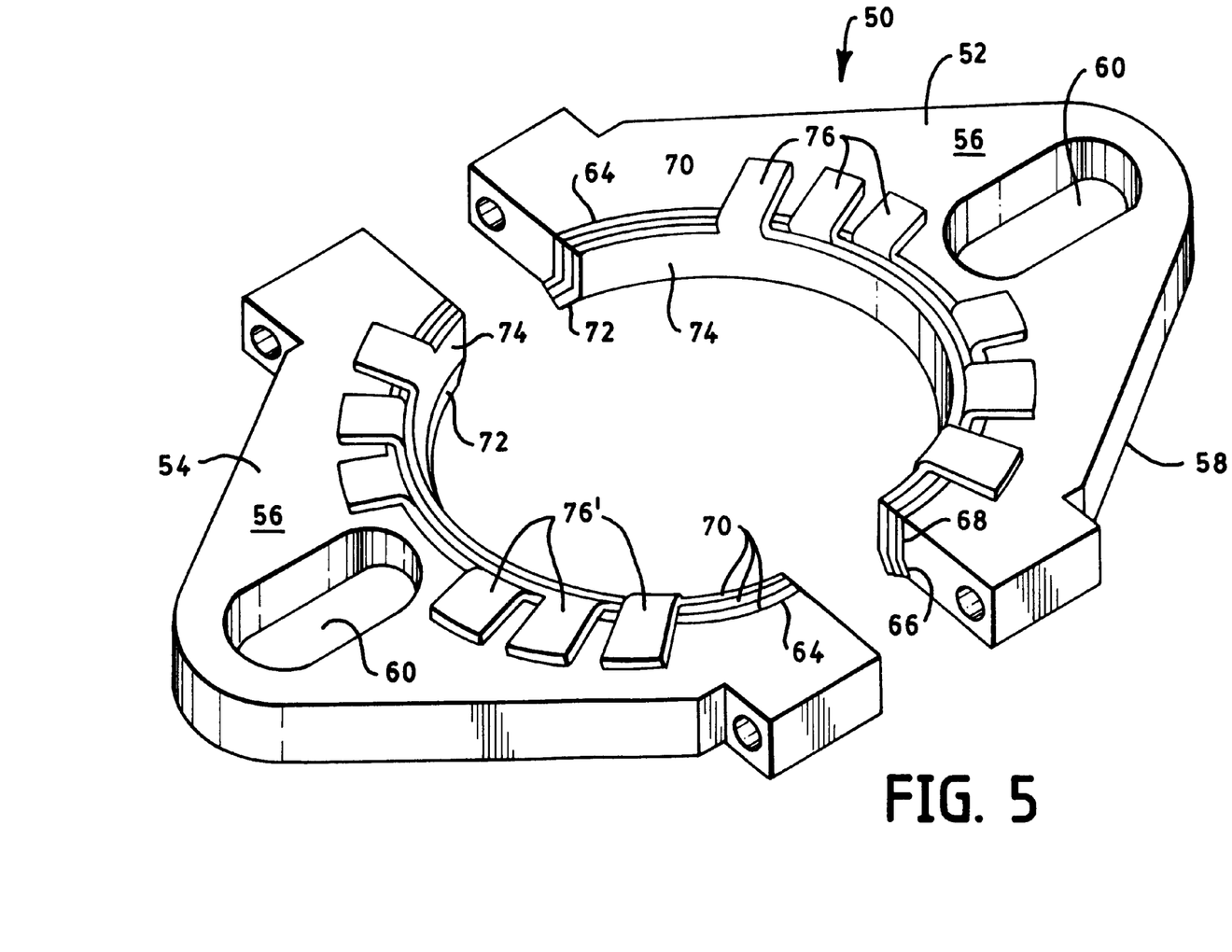
FIG. 5 is a perspective view of an the arrangement of FIG. 4 showing the shims in place.

Referring to FIGS. 4 and 5, an alternative flange structure of this invention 50 is formed from two flange segments 52 and 54, each having two relatively flat substantially identical surfaces 56 and 58. The oval shaped openings 60 are shaped to accommodate a stem of a fastening device (not shown) such as a bolt, screw or the like. The oval openings 60 are sized so that a conventional head (not shown) of the fastening device is sized to extend through oval openings 60 and be positioned along the length 62 of opening 60. The oval openings 60 permit adjustment of the position of flange segments 52 and 54 permit positioning on a conduit having a range of diameters. Each flange segment 52 and 54 is provided with generally cylindrical openings 51 and 53 through which fit conventional fasteners such as bolts or the like in order to secure flange segments 52 and 51

Each flange segment 52 and 54 is provided with a generally circular arc surface 64 having a smooth tapered surface section 66 and a smooth generally cylindrical surface section 68. The tapered section 66 of the flange segments 52 and 54 permits the flange segments 52 and 54 to be positioned about a conduit having a flared end. The cylindrical section 68 of flange segments 52 and 50 permits the flange segments 52 and 54 to be fit about a conduit having a generally cylindrical outside surface.

The shim sections 70, like the flange segments 52 and 54 include a smooth flared segment 72, a smooth generally cylindrical surface section 74. The shim sections 70 include a tab 76 to permit them to fit about the flange segments 52 and 54 or an adjacently positioned shim section. The flared sections 72 permit the flange structure 50 to be positioned about a conduit having a flared end. The cylindrical sections 74 permit the flange segments 52 and 54 and shim sections 70 to be fit about a conduit having a generally cylindrical outside surface.

Figure 6:
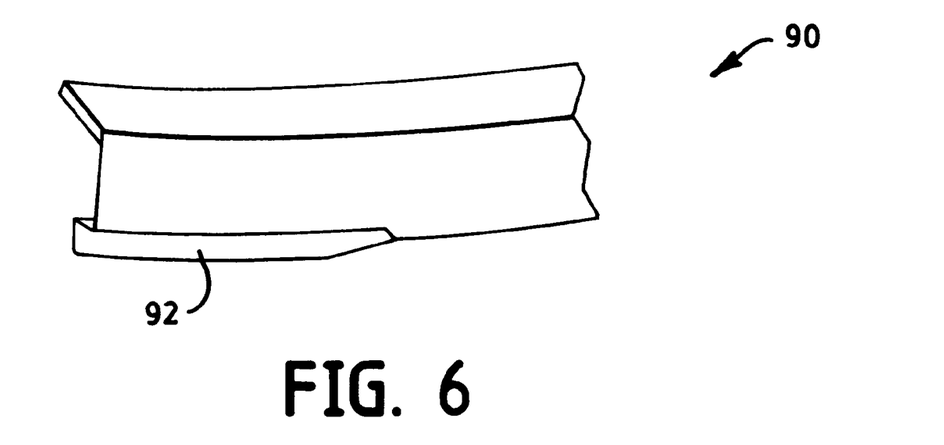
FIGS. 6 and 7 illustrate a shim of this invention wherein the slot section extends only a portion of the length of the shim.
Figure 7:
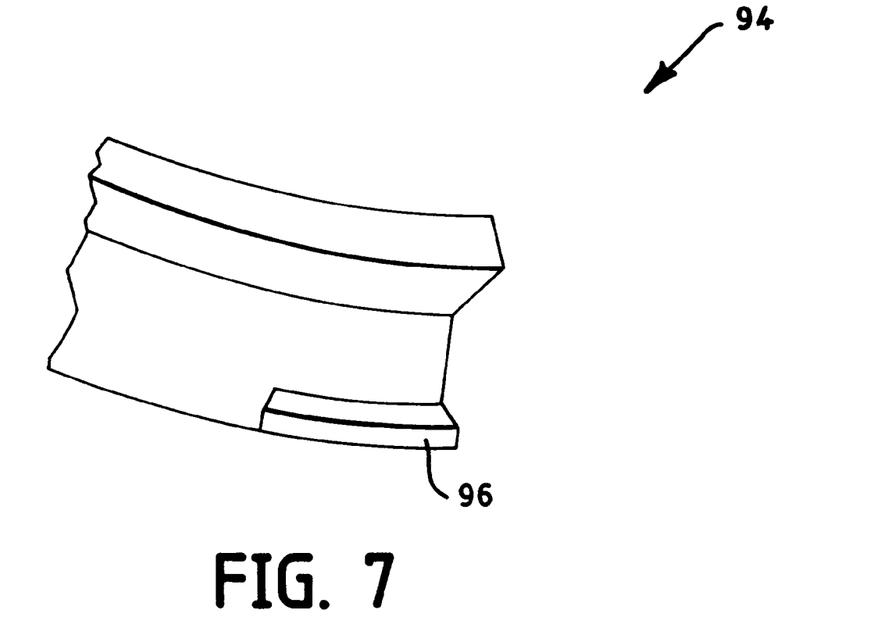
Figure 8:
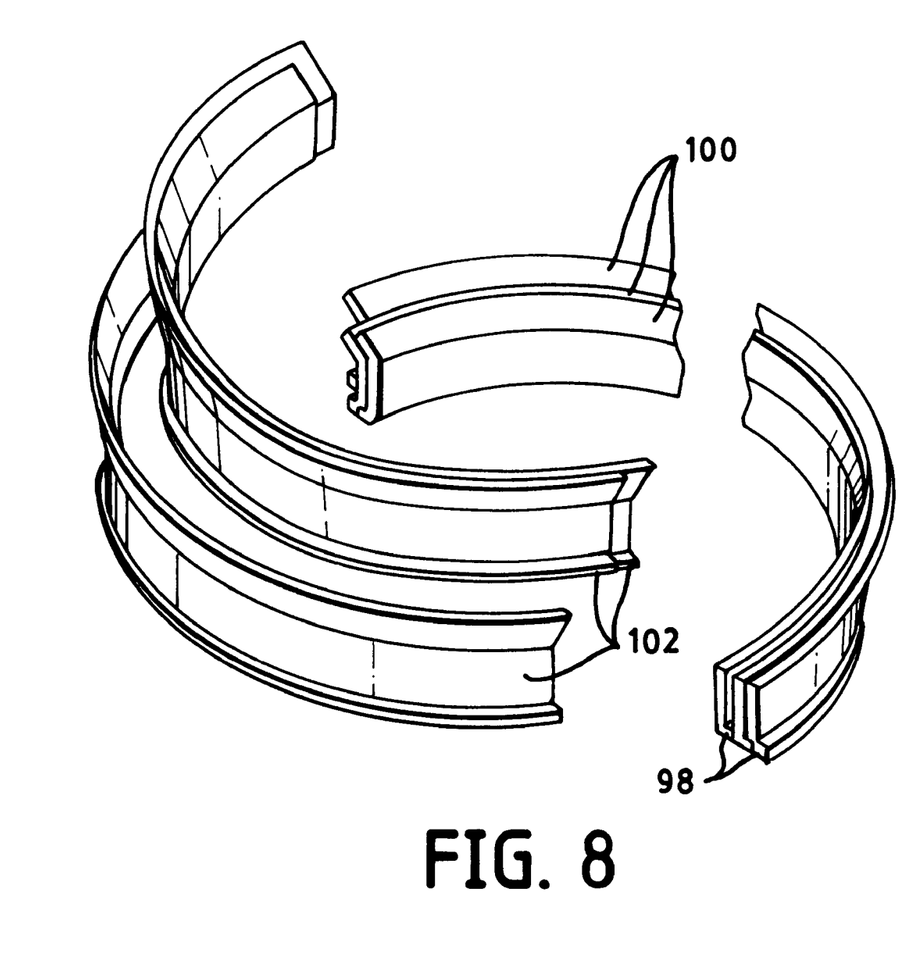
FIG. 8 is a perspective view of the shims in FIGS. 6 and 7 assembled together.

Referring to FIGS. 6 and 7, an alternative shape for the flange segments, and for a mating shim section are shown. The flange segment 90 has a slot portion 92 which extends only a portion of the length of the flange section 90. The mating shim section 94 has a flange 96 which extends only a portion of the length of shim section 94 so that it fits within slot portion 92. Likewise, the shim section 94 can have a slot portion 96 which extends only a portion of the length of the shim section 94 as does the flange segment 90. The shims of this invention can comprise three sets of shims 98, 100 and 102.

I claim:

1. A flange structure which comprises:
    a plurality of joined flange segments each having two faces,
    each of said segments having a first inner surface shaped as a generally circular arc,
    said first inner surface having a first smooth surface segment extending in a direction generally perpendicular to said faces said first smooth surface segment being directly connected to a second smooth surface segment being tapered away from a central axis of said arc toward one of said faces,
    fastening means for fastening said flange segments together, said fastening means extending in a direction generally perpendicular to said central axis,
    at least one shim attached to said first inner surface, said at least one shim having a tab extending away from said inner surface in a
    direction generally perpendicular to said first smooth surface and having a second inner surface having essentially the same shape as said first smooth surface and said second surface segment,
    and means for attaching said flange structure to a substrate.

2. The flange structure of claim 1 formed from two flange segments.

3. The flange structure of claim 1 formed from three flange segments.

4. The flange structure of claim 1 wherein said means for attaching comprises two oval shaped openings extending between said two faces.

5. The flange structure of claim 2 wherein said means for attaching comprises two oval shaped openings extending between said two faces.

6. A flange structure which comprises:
    a plurality of joined flange segments each having two faces,
    each of said segments having a first inner surface shaped as a generally circular arc,
    said first inner surface having a first smooth surface segment extending in a direction generally perpendicular to said faces, said first smooth surface segment being directly connected to a second smooth surface segment being tapered away from a central axis of said arc toward one of said faces and a slot segment directly connected to said first smooth surface segment,
    fastening means for fastening said flange segments together, said fastening means extending in a direction generally perpendicular to said central axis,
    at least one shim attached to said first inner surface, said at least one shim having a second inner surface having essentially the same shape as said first smooth surface segment, said second surface segment and said slot segment directly connected to said first smooth surface segment, said at least one shim having a flange section which fits into a slot segment of an adjacently positioned flange segment or shim,
    and means for attaching said flange structure to a substrate.

7. The flange structure of claim 6 formed from two flange segments.

8. The flange structure of claim 6 formed from three flange segments.

9. The flange structure of claim 6 wherein said means for attaching comprises two oval shaped openings extending between said two faces.

10. The flange structure of claim 7 wherein said means for attaching comprises two oval shaped openings extending between said two faces.

11. The flange structure of any one of claims 6, 7, 9 or 10 having a plurality of shims wherein an innermost shim has a third inner surface having essentially the same shape as said first smooth surface segment and said second smooth surface segment.

12. The flange structure of any one of claims 6, 7, 9 or 10 wherein said slot segment of said at least one shim extends the entire length of said shim.

13. The flange structure of any one of claims 6, 7, 9 or 10 wherein said slot segment of said at least one shim extends a portion of the length of said shim.

14. A flange structure which comprises:

- a plurality of joined flange segments each having two faces,
- each of said segments having a first inner surface shaped as a generally circular arc,
- said first inner surface having a first smooth surface segment extending in a direction generally perpendicular to said faces, said first inner surface being directly connected to a second smooth surface segment being tapered away from a central axis of said arc toward one of said faces and a slot segment directly connected to said first smooth surface segment, said slot segment extending a portion of the length of said flange segments,
- fastening means for fastening said flange segments together, said fastening means extending in a direction generally perpendicular to said central axis,
- and means for attaching said flange structure to a substrate.

15. The flange structure of claim 14 formed from two flange segments.

16. The flange structure of claim 14 formed from three flange segments.

17. The flange structure of claim 14 wherein said means for attaching comprises two oval shaped openings extending between said two faces.

18. The flange structure of claim 15 wherein said means for attaching comprises two oval shaped openings extending between said two faces.

19. The flange structure of any one of claims 14, 15 17 or 18 wherein said slot segment of said at least one shim extends the entire length of said shim.

20. The flange structure of any one of claims 6, 7, 8, 9 or 10 wherein said slot segment and said flange segment extend along a portion of the length of said at least one shim.

* * * * *